Figure 1:
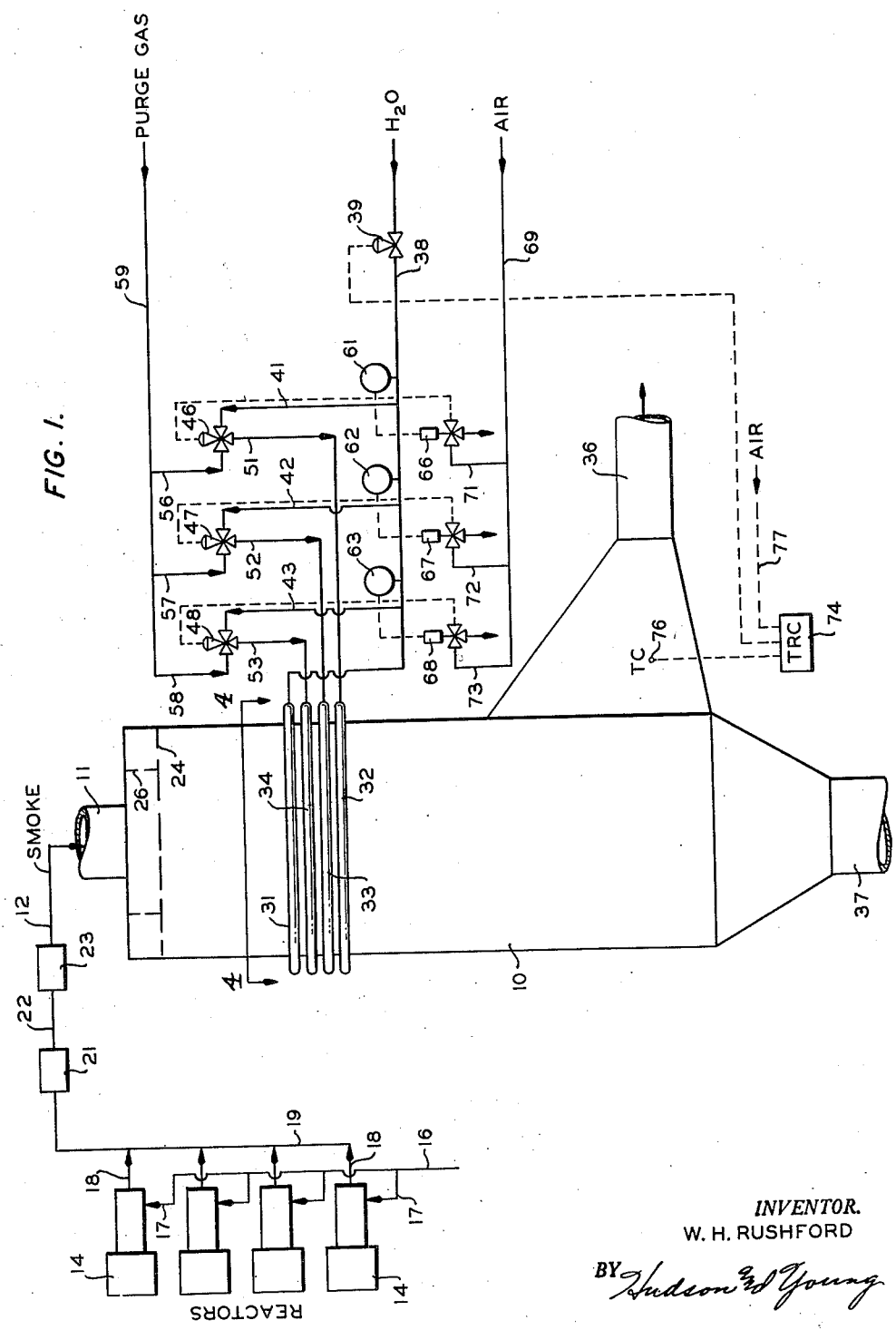

INVENTOR.
W. H. RUSHFORD
BY Hudson and Young
ATTORNEYS

United States Patent Office 2,812,929
Patented Nov. 12, 1957

2,812,929

PROCESS AND APPARATUS FOR INJECTING A FLUID INTO A DISPERSION ZONE

Wilson H. Rushford, Borger, Tex., assignor to Phillips Petroleum Company, a corporation of Delaware Application January 27, 1955, Serial No. 484,409

19 Claims. (Cl. 261—17)

This invention relates to a process and apparatus for injecting a fluid at variable flow rates and at relatively constant pressure into a dispersion zone in which varying dispersion requirements exist. A specific aspect of the invention is concerned with cooling a gaseous effluent from carbon black furnaces or reactors.

Various cooling, humidification, and reaction processes utilized in industry require the spraying or dispersion of a suitable fluid into a dispersion zone to control the temperature, the humidity or the vapor pressure of a component of a fluid effluent from the zone. In many of these processes the dispersion requirements vary, thereby requiring varying flow rates of liquid into the dispersion zone. In these processes it is conventional to spray or inject the fluid into the dispersion zone thru a plurality of sprays or injection nozzles and as conditions require a change in the rate of flow of fluid into the dispersion zone, the pressure in the line feeding the sprays or nozzles is increased or decreased to effect the desired change in flow rate thru the dispersion elements. A difficulty in this type of operation lies in the fact that as the pressure in the fluid supply line is varied the effectiveness of the dispersion is likewise varied. Where water or other liquid is being injected into a gaseous ambient, as the pressure in the supply line is varied the fineness of the spray liquid from the sprays in the system is varied. As the flow rate is reduced the size of the droplets in the spray is increased so that under low flow rate conditions the rate of evaporation, humidification, or reaction is greatly reduced because of the increased size of the droplets and this condition frequently results in incomplete vaporization of the liquid sprayed into the vaporization zone. In some processes this is highly undesirable because of the corrosive effect of the liquid which usually contains dissolved or entrained substances, as the liquid contacts the walls of the vaporizing zone and the equipment downstream of the vaporizer. In addition it is difficult to effect adequate control of the vaporization rate under all conditions in vaporizer. In effecting difficultly controllable chemical reactions between gases or between liquids and gases, the rate of dispersion of one reactant or group of reactants in another is important in controlling temperature in the dispersion-reaction zone.

I have devised a process and apparatus for injecting or spraying a fluid into a dispersion or mixing zone for the purpose of cooling and quenching a gas, or controlling a reaction therein, or for introducing the vapor of a liquid into an effluent gas from a vaporizer in a desired concentration, which process and apparatus maintain a relatively constant fluid pressure in the supply lines feeding the sprays, nozzles, or injection orifices under varying flow rate conditions so that the fineness of the spray droplets or effectiveness of the mixing or dispersion is substantially constant under different flow rate conditions. The invention utilizes a series of battery of sprays connected with a main fluid feed or supply line and one or more branch feed lines connecting with the main feed line each of which leads to one or more auxiliary sprays within the vaporizing zone. (The term "spray" or "spray head" is to be understood to include any type of injection orifice.) As the process to which the sprayed fluid is fed requires increased dispersion rate and increased flow rate in the feed line, the pressure in the main feed supply line is maintained within a relatively narrow range of pressure with a system of flow and pressure controls which open a valve in one of the branch lines so as to add an auxiliary spray or group of sprays to the fluid flow system and the flow rate thru the main feed line is thereby increased with only minor variation in pressure. In this manner the pressure drop across the sprays, including the additional sprays connected with the main supply line thru their branch feed line, remains relatively constant. When dispersion requirements are again substantially increased, the apparatus of the invention provides for the inclusion of another spray or group of sprays to the spraying system in the same manner as the first group is added. Additional sprays or groups of sprays are added to the spraying system as requirements of the process demand so that the pressure drop across the spray heads is relatively constant under a wide range of flow rate conditions requiring a varying number of sprays to supply the necessary fluid.

The invention provides an improved process and apparatus for cooling a gaseous carbon black-containing effluent from one or more carbon black furnaces or reactors and will be described in some detail relative to such an application although the invention is not limited to this specific application but on the contrary is applicable to any process requiring the spraying of a fluid into a dispersion zone under varying flow rate requirements such as is required in the humidification of air or other gaseous ambient, or in effecting chemical reactions between two or more reactants requiring intimate mixing of reactants at varying rates. The broadest aspect of the invention comprises controlling the flow rate of fluid being dispersed thru a plurality of sprays into a dispersion zone of variable dispersion requirements by maintaining the pressure drop across the sprays within a narrow range and varying the rate of dispersion by varying the number of sprays utilized in effecting the dispersion, and the means for accomplishing this control.

The invention is applicable to the oxidation of liquid cyclohexane with air to form cyclohexanol, cyclohexanone and other oxidation products and to the oxidation of other liquid hydrocarbons in a similar manner. In this type of process air is injected thru sprays at variable flow rates in order to control the rate of reaction as measured by the temperature of the effluent from the oxidation chamber in a similar manner to that hereinafter described in connection with the cooling of a gaseous effluent from a carbon black reactor. The significant difference lies in the injection of a gaseous fluid into a liquid as contrasted with injection of a liquid into a gaseous ambient in the cooling of carbon black smoke.

The invention is also applicable to processes in which a gas is distributed or dispersed in a gaseous ambient illustrated by the chlorination of hydrocarbons in gaseous form by spraying gaseous chlorine into the hydrocarbon gases passing thru the dispersion or reaction chamber. In such a process it might also be desirable to inject the chlorine in liquid form and in either instance dilution of the chlorine with an inert gas or liquid might be desirable to adequately control the reaction.

Figure 2:
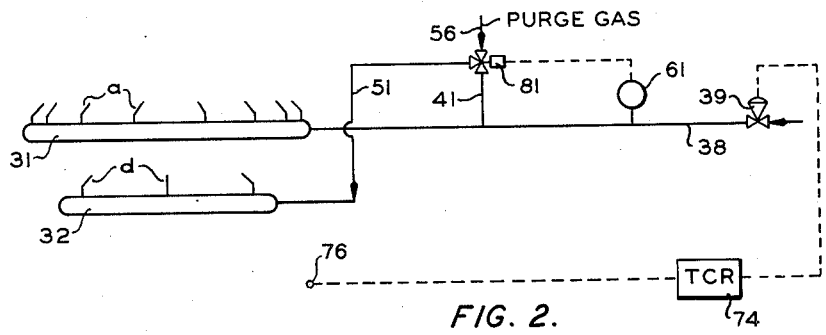
Figure 3:
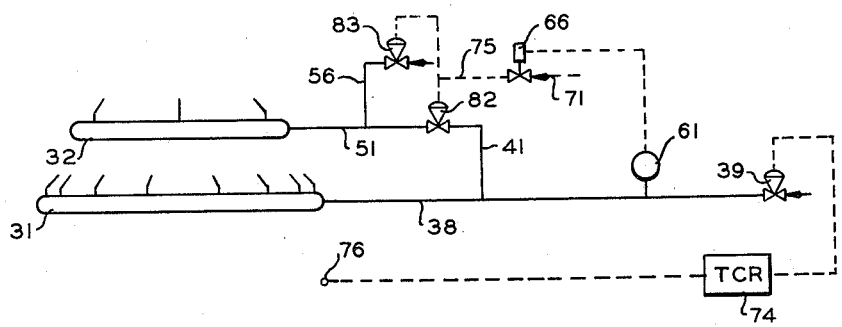
Figure 4:
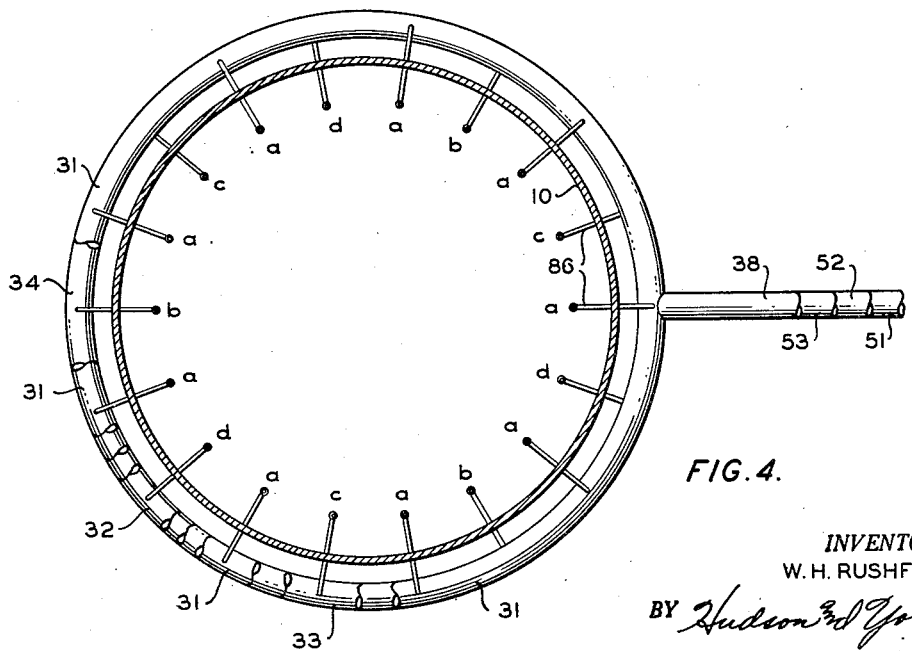

A more complete understanding of the invention may be had from a consideration of the drawing of which Figure 1 is a plan view of one arrangement of apparatus suitable for effecting the process of the invention; Figure 2 is a plan of a second embodiment of a valve and control arrangement of the invention; Figure 3 is a plan view of a third embodiment of a suitable valve and control arrangement; and Figure 4 is a transverse cross section of the cooling tower of Figure 1 taken on the line 4—4. The various views are diagrammatic and corresponding parts therein are designated with corresponding numbers.

Referring to Figure 1, a cooling tower or vaporization chamber 10 receives a gaseous stream thru an inlet conduit 11 from a feed line 12. The gaseous material in line 12 comes from a series of carbon black reactors 14 to which is fed a stream of oil and a stream of air in proper proportions in conventional manner (not shown) so as to heat the vaporized oil under partial combustion conditions and crack the remaining oil to carbon black in conventional manner. As the effluent smoke passes from the outlet end of the furnaces, the same is quenched with a direct stream of water from line 16 and branch lines 17. The effluent, quenched to below reaction temperature, passes thru conduits 18 into a common flow line 19 which conducts the hot gaseous material to a secondary quenching chamber 21 for additional quenching to a desirable temperature and the resulting quenched effluent is passed via line 22 to a recovery system 23 which usually comprises a series of Cottrell precipitators and a series of cyclone separators. In usual practice the effluent entering line 12 from the carbon black recovery system 23 contains about 5 percent of the carbon black formed in the reactors. It is economical and advantageous to recover this 5 percent carbon black from the smoke in line 12 and for this purpose the smoke is passed to a series of bagfilters fabricated from synthetic fiber, such as Orlon, which filter out substantially all of the carbon black but which will not withstand temperatures substantially above 275° F. It is therefore necessary to further reduce the temperature of the smoke to a temperature not substantially above about 260° F. It is advantageous to maintain the temperature of the effluent from cooling chamber 10 as near 260° F. as possible because substantially lower temperatures result in condensation of moisture from the water vapor in the effluent stream on the walls of the equipment, thereby corroding the same and greatly limiting the life of the equipment. As the smoke passes thru the bag filters substantially all of the entrained carbon black is recovered and the effluent smoke is colorless and is vented to the atmosphere.

The smoke entering tower 10 at a temperature substantially above 270° F., such as 400–500° F., is distributed over the entire cross section of the tower by means of a perforate baffle 24 suspended below the upper end of the tower by means of supports 26 in any suitable manner. As the smoke descends the tower the required amount of water to reduce the temperature of the smoke to about 260° F. when the water is completely vaporized is sprayed into the tower by means of a system of sprays attached to water manifolds 31, 32, 33 and 34 and shown in Figure 4. The quenched smoke and water vapor pass from the tower thru outlet conduit 36 to a bag filter unit comprising a series of bag filters (not shown). An outlet 37 containing a suitable valve (not shown) provides for removal of any carbon black knocked down in the cooling chamber.

The spray and control system comprises a main water supply line 38 in which is positioned a variable flow control valve 39 of any conventional design or construction, such as an air operated diaphragm valve. This main feed line 38 connects directly with manifold 31 which is connected to and feeds the main battery of sprays within the cooling tower. A series of branch lines 41, 42, and 43 connect with main supply line 38 and with 3-way air operated diaphragm valves 46, 47, and 48, respectively, which in turn connect with lines 51, 52, and 53, respectively. Lines 51, 52, and 53 connect with auxiliary manifolds 32, 33, and 34, respectively, thereby passing water from main water supply line 38 thru these valves to the auxiliary water manifolds on tower 10 each of which is connected with a separate spray or group of sprays.

It has been found desirable and effective in preventing carbon black plugging of sprays connected with any of the manifolds not in service at a given time to pass a purge gas of an inert character, such as natural gas, flue gas, or steam, thru such sprays not in service. This is accomplished by connecting valves 46, 47, and 48 with purge gas supply lines 56, 57, and 58, respectively, which are connected to a purge gas feed line 59.

In order to operate valves 46, 47, and 48 at the proper time, Mercoid pressure switches 61, 62, and 63 are connected in supply line 38 at suitable points and these switches are operatively connected to solenoid operated 3-way valves 66, 67, and 68, respectively, which are each connected with an instrument air line 69 by means of lines 71, 72, and 73, respectively. Three-way valves 66, 67, and 68 are operatively connected with 3-way valves 46, 47, and 48, respectively, by means of the instrument air lines shown. Each of valves 66, 67, and 68 has a vent line as shown.

Variable flow control valve 39 is controlled by temperature-recorder-controller 74 to which it is operatively connected by an air line. This instrument is actuated by a suitable temperature sensitive device 76 positioned in the effluent from tower 10 preferably in the effluent line 36 in close proximity to tower 10. Any conventional temperature sensing device, such as a thermocouple, may be utilized for the purpose of sensing temperature of the gaseous effluent and actuating controller 74. Instrument air is supplied to instrument 74 by means of air line 77.

In describing operation of the process and apparatus as shown in Figure 1, it is assumed that the flow rate and/or temperature of the gaseous stream introduced to tower 10 thru inlet 11 are inherently variable. Under steady state operating conditions the temperature of the effluent flowing thru line 36 is constant and this is also true of the flow of water thru line 38. Now, assuming that cooling requirements are such under these steady flow conditions that sufficient quench water is supplied thru the main flow line 38 and the spray heads in the group attached to manifold 31, then as the volume and/or temperature of the smoke introduced to the tower thru line 11 increases, thereby requiring additional quench water, the temperature of the effluent gas at thermocouple 76 rises slightly thereby actuating instrument 74 which in turn actuates valve 39 so as to further open this valve and increase the flow rate of water thru line 38. As this occurs the pressure downstream of valve 39 tends to increase and switch 61, which is set to operate at a pressure a few pounds above the initial operating pressure, acts to actuate valve 66 which passes instrument air from line 71 to valve 46 thereby shutting off the flow of purge gas thru line 56 and valve 46 to line 51 and the spray heads connected with manifolds 32 and introducing water from branch line 41 into branch feed line 51. The repositioning of valve 46 so as to pass water to the sprays connected with manifold 32 has a stabilizing effect on the pressure in line 38. If, however, the cooling demands in tower 10 are sufficiently increased at any time, switch 62, which operates in a manner similar to switch 61 but at a few pounds higher pressure, cuts off the flow of purge gas thru lines 57 and 52 to manifold 33 and the spray heads connected therewith and initiates the flow of water thru branch line 42 and branch feed line 52 to the spray heads connected with manifold 33. In the extreme case in which the cooling demands are still not met by the flow of water thru main line 38 and both branch feed lines 51 and 52 as indicated by temperature sensitive device 76, the device automatically opens valve 39 thereby increasing the pressure in line 38 downstream of this valve which actuates switch 63 (set to operate at a slightly higher pressure than switch 62) to throw another spray or group of sprays connected with manifold 34 into the water circuit thru line 43, valve 48, and line 53.

If the system is operating with any or all of the auxiliary spray heads connected with manifolds 32, 33, and 34 in circuit thru their respective branch lines and valves with main supply line 38 and the cooling requirements in the tower are decreased by a change in the character of the smoke fed to the tower, the temperature at instrument 76 increases and this instrument acting thru temperature-recorder-controller 74 partially closes valve 39 thereby decreasing the pressure in line 38 downstream of this valve. As this pressure is decreased sufficiently (within a narrow range) the switch of the group 61, 62, and 63, which operates at the nearest lower pressure to the operating pressure at this time, effects the reversal of the valve of the group 46, 47, and 48 with which it is operatively connected so as to cut off the flow of water and cut in the flow of purge gas to its respective manifold and spray heads. Assuming that all three auxiliary groups of sprays are in circuit with the main water line and cooling requirements are sufficiently decreased, the temperature sensing equipment connected with the effluent line operates valve 39 so as to decrease the flow of water thru the valve and thereby decrease the pressure downstream in line 38. Switch 63 which was the last switch of the series to function will operate first to cut off the flow of water to the auxiliary sprays connected with manifold 34 and reestablish flow of purge gas thereto. As cooling requirements are still further diminished by cutting off the flow of effluent gas from one or more reactors in battery 14 or by a decrease in the temperature, the gas entering tower 10, switches 62 and 61 functions successively to cut the flow of water to manifolds 33 and 32, respectively, and reestablish purge gas flow thru these manifolds and the sprays connected thereto. Thus, in the manner described, the arrangement of apparatus shown in Figure 1 functions to spray water into cooling tower 10 over a wide range of flow rates while maintaining the pressure in the lines feeding the sprays within a relatively narrow range and therefore a narrow range of pressure drop across the spray heads with substantially uniform spraying conditions so that the water sprayed into the hot ambient is effectively completely vaporized without permitting drops of water to settle to the bottom of the tower.

Referring to Figure 2, the arrangement shown provides a similar temperature sensitive flow control thru valve 39 in line 38 but utilizes a different arrangement of apparatus for cutting off and reestablishing liquid flow thru the branch feed lines to the auxiliary sprays. This figure shows only one set of auxiliary sprays and the control and feed mechanism for operating the same but it is to be understood that any number of these groups of auxiliary sprays with their connecting lines and controls may be utilized as in the apparatus of Figure 1. In the arrangement shown, switch 61, which is a pressure sensitive switch adapted to send out an electrical signal or impulse when the same is actuated by set minimum and maximum pressures in line 38, is operatively connected to a 3-way solenoid switch 81. When the pressure in line 38 decreases below a predetermined set pressure, switch 61 is actuated so as to reverse solenoid valve 81 and thereby cut off the flow of water from branch line 41 to feed line 51 leading to manifold 32 and the sprays connected thereto. Reversal of 3-way valve 81 cuts in the flow of purge gas from line 56 thru the valve to line 51 and the spray heads connected with manifold 32. When the pressure in supply line 38 increases to a predetermined maximum pressure a few pounds above the minimum, switch 61 is again actuated so as to reverse solenoid valve 81 thereby reestablishing the flow of water thru line 41, valve 81, line 51, manifold 32 and the auxiliary spray heads connected therewith. When operating with more than one set of auxiliary spray heads with the arrangement of apparatus shown in Figure 2, switches 61, 62, 63, etc. function sequentially as described in connection with Figure 1.

Figure 3 utilizes the same type of temperature control on valve 39 as is described in connection with Figures 1 and 2. The arrangement of control valves is similar to that shown in Figure 1 in that switch 61 is operatively connected with a 3-way solenoid valve 66 which feeds instrument air from line 71 to a branched instrument air line 75 connected with an air-operated diaphragm valve 82 in line 41 and with a similar valve 83 in purge gas line 56. In this arrangement separate valves are utilized for passing water and purge gas to line 51. These valves 82 and 83 are designed to function oppositely with respect to opening and closing on the air signal in line 75. In other words, when instrument air pressure is introduced to line 75, valve 82 opens and valve 83 closes, or vice versa.

Figure 4 shows one arrangement of water distribution manifolds 31, 32, 33, and 34 connected with lines 38, 51, 52, and 53, respectively, and with spray heads a, b, c, and d, respectively. The spray heads are connected with their respective manifolds by short feeder lines 86 extending from the manifolds thru the wall of tower 10. It can be seen that manifold 31 which is connected with main supply line 38 feeds liquids to all of spray heads "a," which number 13 in the arrangement shown, and each of manifolds 34, 33, and 32 are connected with three spray heads which are distributed in spaced arrangement around the tower. The spray heads "a" are spaced so as to cover the entire cross section of tower 10 so as to provide efficient cooling and/or vaporization when only this main set of sprays is in operation. The spray heads b, c, and d are arranged so that the cutting in of any one or all of the auxiliary groups of spray heads on the water supply line does not materially alter the general spray pattern but merely provides additional volume or spray rate of the liquid being sprayed.

The arrangement shown in Figure 4 is merely illustrative and any arrangement of the spray heads within tower 10 which effectively covers the entire cross sectional area of the tower with relatively uniform spray distribution may be used to effect the desired cooling and/or vaporization. Spray heads a, b, c, and d are preferably directed upwardly at an angle of about 45° and, in a cooling tower 20 feet in diameter, the sprays are positioned about 18 inches from the wall of the tower and 9 feet below baffle plate 24. The spray heads may be disposed at the same level or each group of sprays may be disposed at a different level within tower 10 but preferably in close proximity to each other. Any type of spray head which delivers a fine spray at the desired operating pressure may be utilized.

The invention is not limited as to the type of valves and actuating switches shown and described. Switches 61, 62, and 63 may be pressure sensitive switches which send out an instrument air signal to instrument-air-operated valves such as the diaphragm valves utilized in the arrangement of Figure 1. Hydraulically operated valves and pressure sensitive devices connected in line 38 which actuate these valves hydraulically directly or indirectly may be utilized. The invention is principally in the arrangement of controls and apparatus and any devices which function to accomplish the control of the number of auxiliary sprays in operation with the main battery of sprays are within the scope of the invention.

To further illustrate the invention the same was utilized in cooling the effluent smoke in a system substantially as shown in Figure 1 in which the effluent from a battery of twenty carbon black reactors was given a primary quench, as it left the individual reactors, to stop the reaction in the hot gas and cool the same to a temperature in the range of 1000–1100° F. The partially quenched effluent in line 19 was passed thru a secondary quench chamber where the hot gases were quenched by indirect heat exchange to a temperature in the range of 400–500° F. The resulting effluent was passed thru a recovery system comprising Cottrell precipitators and cyclone separators to recover approximately 30 and 65 percent, respectively, of the carbon black in the gases. The effluent smoke from the recovery system containing about 5 percent of the carbon black originally entrained in the gaseous effluent from the furnaces was passed into a cooling tower, constructed in the manner shown and illustrated as tower 10, for treatment in accordance with the invention. Tower 10 was 20 feet in diameter and about 62 feet high. Baffle distribution plate 24 was located 3 feet below the top of the tower and the spray heads were approximately 9 feet below the baffle plate disposed at a common level in a main battery of thirteen spray heads and three auxiliary groups of spray heads of three sprays each separately connected to individual manifolds in a manner similar to that shown in Figures 1 and 4.

The temperature of the cooled effluent was maintained substantially at 260° F.±5° for several months under cooling requirements which varied over a considerable range due to taking one or more reactors off stream on several occasions and again putting them on stream. The varied cooling requirements were effectively taken care of by a system of controls such as that illustrated in Figure 1. In the system shown the pressure in line 38 was maintained in the range of 265 to 295 p. s. i. g. Switch 61 was set to actuate valves 66 and 46 so as to open the latter to the flow of water to the auxiliary set of sprays on manifold 32 and cut off the flow of purge gas at a line pressure of 275 p. s. i. g. and reverse valve 46 at line pressure of 270. Switch 62 was set to operate valves 67 and 47 to initiate water flow at a line pressure of 285 p. s. i. g. and cut flow off at 280 p. s. i. g. Switch 63 was set to operate in a like manner at 295 and 290 p. s. i. g.

The system is designed so that the main battery of spray heads connected with manifold 31 provides adequate cooling for the minimum number of reactors on stream at a line pressure in the range of about 250 to 275 p. s. i. g. and so that all of the auxiliary spray heads in circuit with water line 38 in addition to the main battery of spray heads affords adequate flow at a pressure in the range of about 295 to 325 p. s. i. g. to control the temperature of the effluent gases under maximum production conditions with all of the reactors in the battery on stream.

After an extended period of operation, the valve arrangement was changed to that shown in Figure 2 so that switches 61, 62, and 63 operated corresponding solenoid switches substituted for switches 46, 47, and 48, respectively. This arrangement worked equally effectively in maintaining a substantially constant effluent temperature of about 260° F. in line 36.

With either system or arrangement of controls, as the volume and/or temperature of gas passing into tower 10 increased the temperature at thermocouple 76 started to rise and instrument 74 immediately increased the flow of water thru line 38 by regulation of valve 39 and this increased the pressure in line 38. As the pressure in line 38 increased to the next higher operating pressure of any one of valves 61, 62, or 63, the branch line feeding an auxiliary set of sprays in circuit with that particular switch was put on stream so as to feed water to an auxiliary set of sprays. If the temperature continued to rise at thermocouple 76 because of increased cooling requirements, an additional switch was actuated as valve 39 was further opened and pressure in line 38 rose to the lower operating pressure of that particular switch, thereby putting another auxiliary set of sprays on flow.

As cooling requirements decreased due to a lower flow rate of gas to tower 10 and/or a lower inlet gas temperature, the temperature at thermocouple 76 began to lower and this actuated valve 39 thru instrument 74 so as to reduce the flow rate and thereby the pressure in line 38 downstream of valve 39. As the pressure reached the lower operating pressure of any one of switches 61, 62, or 63, the auxiliary set of sprays operated by the particular switch was cut off from the flow of water and put on flow to purge gas. Three-way valves 46, 47, and 48 maintained flow of purge gas thru the auxiliary sprays when the same were not on water flow.

When the apparatus described herein is utilized in effecting processes wherein the plugging of sprays not on stream is negligible, the valves utilized in cutting off and reestablishing the flow of dispersion fluid in the auxiliary lines may be simplified accordingly, ordinary reversing valves being adequate to perform the required function.

Certain modifications of the invention will become apparent to those skilled in the art and the illustrative details disclosed are not to be construed as imposing unnecessary limitations on the invention.

I claim:

1. Apparatus for injecting a fluid under pressure into a dispersion chamber at varied flow rates at relatively uniform pressure comprising a dispersion vessel having a fluid inlet and a fluid outlet; a supply line for feeding fluid under pressure into said vessel; a variable flow control valve in said supply line; a plurality of spray heads within said vessel each communicating with said supply line, at least one of said spray heads being connected on a branch line fed from said supply line downstream of aforesaid valve; a valve in said branch line; a sensing device communicating with the interior of said vessel downstream of said sprays and adapted to determine a variable characteristic of the fluid therein resulting from the rate of dispersion of said fluid, said sensing device being in actuating communication with said variable flow control valve; pressure sensing means in said supply line intermediate said flow control valve and said branch line; and means operatively connected with said pressure sensing means for closing the valve in said branch line when said pressure drops below a standard pressure.

2. The apparatus of claim 1 including a purge gas line connected with said branch line and adapted to introduce a purge gas to said line downstream of the valve therein when last said valve cuts off the supply of fluid and continue the introduction of purge gas as long as supply of said fluid is cut off.

3. The apparatus of claim 2 wherein the valve in said branch line comprises a 3-way valve also connected with said purge gas line, being adapted to admit flow of gas and water alternately to said at least one of said spray heads at minimum and maximum pressures in said supply lines.

4. Apparatus for spraying water under relatively uniform pressure at varied flow rates into a cooling zone to cool a hot gas passing thru same comprising a cooling chamber having a gas inlet and a gas outlet; a water supply line leading into said chamber; a variable flow control valve in said line; a plurality of spray heads within said chamber each communicating with said supply line; a temperature sensing device in said chamber downstream of said spray heads operatively connected with said variable flow control valve so as to regulate the flow of water in response to temperature variations; a second group of spray heads within said chamber connected by a valved branch line to said supply line downstream of said flow control valve; and means for sensing pressure in said supply line and closing and opening the valve in said valved branch line when the pressure in said supply line reaches a predetermined minimum and maximum, respectively.

5. The apparatus of claim 4 including a purge gas line connected with said branch line and means for passing purge gas thru said branch line to said second group of spray heads when the flow of water in said branch line is cut off.

6. The apparatus of claim 5 wherein the valve in said branch line comprises a 3-way valve connected with said purge line.

7. The apparatus of claim 4 including a purge gas line connected with said branch line downstream of the valve therein; a valve in said purge gas line; and means for opening last said valve and closing same when the valve in said branch line is closed and opened, respectively.

8. The apparatus of claim 7 wherein first said means comprises a pressure sensitive switch in said water supply line adapted to send out a signal when the pressure in said supply line reaches a predetermined minimum and maximum; and a 3-way valve connected with an air supply line, a vent, and an instrument air line connected with the valves in said branch line and said purge line.

9. Apparatus for spraying water under relatively uniform pressure at varied flow rates into a cooling zone to cool a hot gas passing thru same comprising a cooling chamber having a gas inlet and a gas outlet; a water supply line leading into said chamber; a variable flow control valve in said line; a plurality of spray heads within said chamber each communicating with said supply line; a temperature sensing device in said chamber downstream of said spray heads operatively connected with said variable flow control valve so as to regulate the flow of water in response to temperature variations; a second group of spray heads within said chamber connected by a branch line to said supply line downstream of said flow control valve; a 3-way valve in said branch line; a purge gas line connected with said 3-way valve; a pressure sensitive switch in said water supply line intermediate said flow control valve and said branch line operatively connected with said 3-way valve so as to close same to flow of water and open same to flow of purge gas when a predetermined minimum pressure is established in said supply line and reverse its position when a predetermined maximum pressure is established in said supply line.

10. The apparatus of claim 9 wherein said switch is a pressure operated electric switch adapted to send out an electrical impulse at said minimum and at said maximum; and said 3-way valve is solenoid operated in response to the impulses from said switch.

11. The apparatus of claim 9 including a plurality of branch lines, each attached to separate spray heads and having valve operating mechanism as described, the pressure operated switches being adjusted to function at progressively lower minimum pressures and progressively higher maximum pressures so that the valves in said branch lines are operated in sequence to progressively reduce the number of spray heads on flow from said water supply line as the pressure in same decreases and progressively increase the number of spray heads on flow from said water line as the pressure in same increases.

12. Apparatus for spraying water under relatively uniform pressure at varied flow rates into a cooling zone to cool a hot gas passing thru same comprising a cooling chamber having a gas inlet and a gas outlet; a water supply line leading into said chamber; a variable flow control valve in said line; a plurality of spray heads within said chamber each communicating with said supply line; a temperature sensing device in said chamber downstream of said spray heads operatively connected with said variable flow control valve so as to regulate the flow of water in response to temperature variations; a second group of spray heads within said chamber connected by a branch line to said supply line downstream of said flow control valve; a 3-way air-operated diaphragm valve in said branch line; a purge gas line connected with said 3-way valve; a 3-way solenoid-operated valve connected with an air supply line, with a vent, and with an instrument air line leading to said diaphragm valve; and a pressure operated electric switch operatively connected with said solenoid-operated valve and adapted to reverse same when a predetermined minimum and a predetermined maximum pressure is reached.

13. The apparatus of claim 12 in combination with a battery of carbon black furnaces having a common effluent smoke line connected with said gas inlet.

14. The apparatus of claim 1 wherein the fluid inlet to said dispersion vessel is connected with a battery of carbon black furnaces through their common effluent smoke line.

15. A process for cooling a stream of hot gas of varying cooling requirements to a controlled temperature which comprises passing said stream of gas thru a cooling zone; spraying a liquid coolant into said gas in said zone thru a plurality of spray devices fed by a common liquid supply line; varying the flow of liquid in a flow control zone in said supply line in response to the temperature of the effluent gas from said zone to effect relatively constant effluent temperature; and varying the number of spray devices in flow on said supply line so as to maintain a relatively constant pressure in said supply line at the changing flow rates.

16. A process for cooling a stream of hot gas of varying cooling requirements to a controlled temperature which comprises passing said stream of gas thru a cooling zone; spraying a liquid coolant into said gas in said zone thru a plurality of spray devices fed by a common liquid supply line; varying the flow of liquid in a flow control zone in said supply line in response to the temperature of the effluent gas from said zone to effect relatively constant effluent temperature; and varying the number of spray devices in flow on said supply line as the pressure in said supply line downstream of said flow control zone varies so as to maintain relatively constant pressure in said supply line downstream of said flow control zone.

17. A process for cooling a stream of gas under varying cooling requirements to a relatively constant temperature by spraying water at varying flow rates into a cooling zone as said gas flows thru same, comprising spraying water thru a plurality of spray heads into said zone at a pressure within a narrow range to maintain said temperature; as cooling requirements in said zone decrease thereby requiring lower flow rates to maintain said temperature, cutting off the flow of water thru such a number of said spray heads as to maintain the flow rate within said narrow pressure range thru the remaining spray heads required to substantially maintain said temperature; as cooling requirements in said zone increase thereby requiring higher flow rates, directing flow of liquid thru additional spray heads in said zone so as to maintain the required flow rate at a pressure within said range to substantially maintain said temperature; and continuously passing a non-deleterious purge gas thru any spray head, while the flow of water therethru is cut off, so as to avoid plugging of same.

18. The process of claim 16 wherein said stream of gas comprises an effluent smoke stream from a series of carbon black furnaces.

19. The process of claim 17 wherein said stream of gases comprises the combined gaseous effluent from a series of carbon black furnaces and said varying cooling requirements are caused by cutting off the flow of effluent from at least one furnace in the series and by adding effluent from at least one furnace to said stream.

References Cited in the file of this patent

UNITED STATES PATENTS

| | | |
|---|---|---|
| 1,284,334 | Hodge | Nov. 12, 1918 |
| 1,782,668 | Stuart | Nov. 25, 1930 |
| 2,028,355 | Russi | Jan. 21, 1936 |
| 2,048,912 | Zisks et al. | July 28, 1936 |
| 2,123,742 | Offen | July 12, 1938 |
| 2,187,905 | Killingsworth | Jan. 23, 1940 |
| 2,702,699 | Kinney | Feb. 22, 1955 |